United States Patent
Kolberg et al.

(10) Patent No.: US 6,852,657 B2
(45) Date of Patent: Feb. 8, 2005

(54) OPTICAL COLORED GLASSES

(75) Inventors: Uwe Kolberg, Mainz-Kastel (DE); Ruediger Hentschel, Bodenheim (DE); Simone Ritter, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/224,071

(22) Filed: Aug. 20, 2002

(65) Prior Publication Data

US 2003/0114292 A1 Jun. 19, 2003

(30) Foreign Application Priority Data

Aug. 22, 2001 (DE) .......................... 101 41 101

(51) Int. Cl.$^7$ .............................. C03C 3/089
(52) U.S. Cl. ........................ 501/65; 501/66; 501/67; 501/900
(58) Field of Search ................ 501/65–67, 900

(56) References Cited

U.S. PATENT DOCUMENTS

| | | | |
|---|---|---|---|
| 3,754,816 A | 8/1973 | Ritze | |
| 6,667,259 B2 | * 12/2003 | Clasen et al. | ........... 501/58 |

FOREIGN PATENT DOCUMENTS

| | | | |
|---|---|---|---|
| DE | 26 21 741 | B2 | 11/1977 |
| DE | 32 06 347 | A1 | 9/1983 |
| JP | 1-248627 | | 10/1989 |
| JP | 5-24884 | | 2/1993 |
| JP | 6-263442 | | 9/1994 |
| RU | 2073657 | C1 | 2/1997 |
| SU | 1527199 | A1 | 12/1989 |
| SU | 1675239 | A1 | 9/1991 |
| SU | 1675240 | A1 | 9/1991 |
| SU | 1677025 | A1 | 9/1991 |
| SU | 1677026 | A1 | 9/1991 |
| SU | 1678785 | A1 | 9/1991 |
| SU | 1678786 | A1 | 9/1991 |
| SU | 1701658 | A1 | 12/1991 |
| SU | 1770297 | A1 | 10/1992 |
| SU | 1770298 | A1 | 10/1992 |
| SU | 1787963 | A1 | 1/1993 |

* cited by examiner

*Primary Examiner*—Karl Group
*Assistant Examiner*—Elizabeth A Bolden
(74) *Attorney, Agent, or Firm*—Baker & Daniels

(57) ABSTRACT

The invention concerns an optical colored glass of the composition (in % in weight on oxide basis) $SiO_2$ 50–62; $K_2O$ 10–25; $Na_2O$ 0–14; $Al_2O_3$ 0–2; $B_2O_3$ 3–5; ZnO 13.5–37; F 0–1; $TiO_2$ 0–7; $In_2O_3$ 0–2; $Ga_2O_3$ 0–2; $SO_3$ 0–1; $SeO_2$ 0–1; C 0–1; $M^I M^{III} Y^{II}_2$ 0.1–3, whereby $M^I$=Cu+ and/or Ag+ and/or $M^{III}$=$In^{3+}$ and/or $Ga^{3+}$ and/or $Al^{3+}$ and/or $Y^{II}$=$S^{2-}$ and/or $Se^{2-}$ and at least 0.1% in weight of the oxide ($M_2O_3$) of the $M^{III}$, which is/are present in $M^I M^{III} Y^{II}_2$, and with at least 0.2% in weight of the oxide, of the $Y^{II}$, which is/are present in $M^I M^{III} Y^{II}_2$.

18 Claims, 1 Drawing Sheet

OPTICAL COLORED GLASSES

Figure 1:
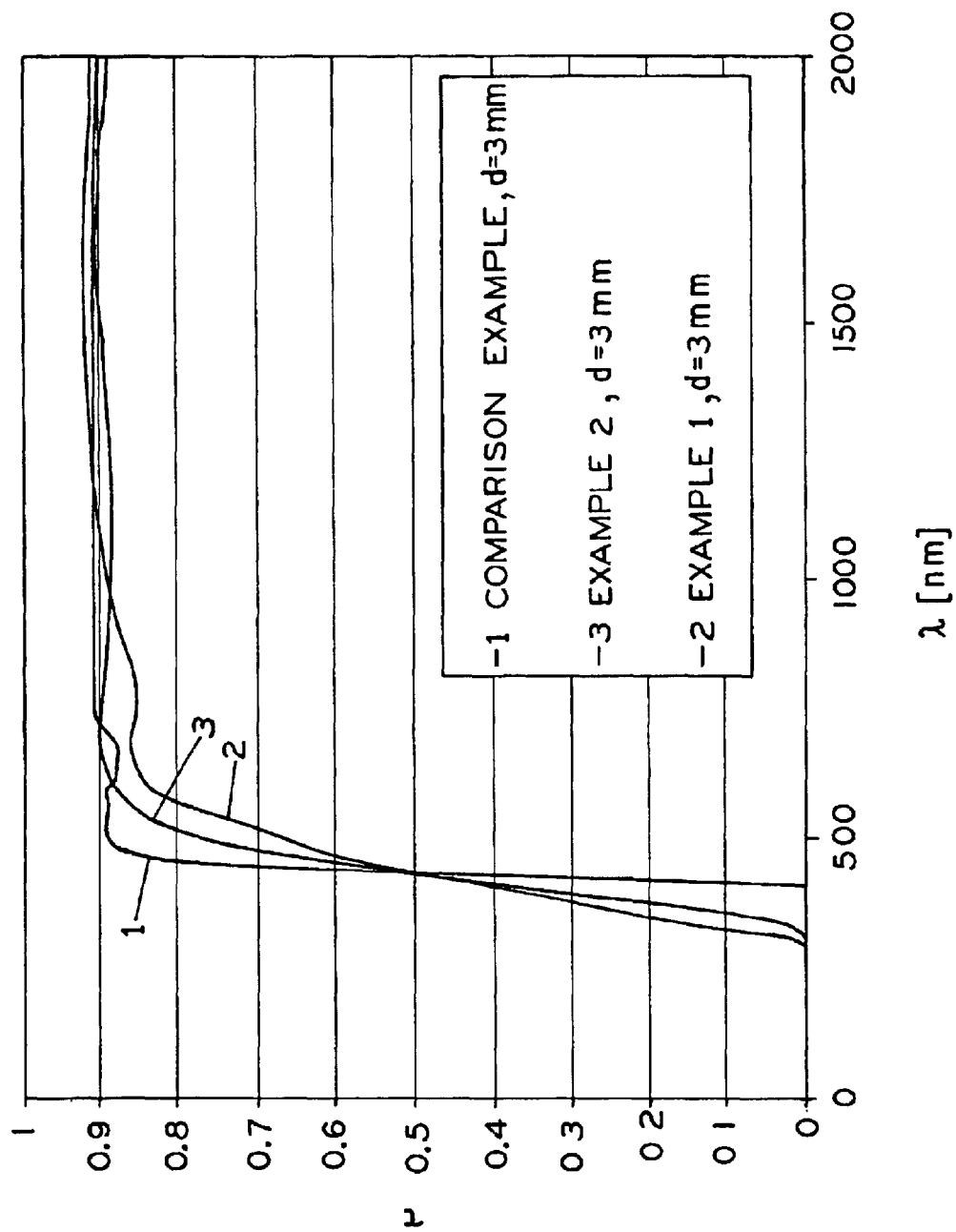

The subject of the invention is an optical colored glass, its use as optical square edge filter as well as an optical square edge filter.

The subject of the invention is also a procedure for the production of optical colored glasses.

Optical square edge filters are characterized by characteristic transmission properties. Thus ones with long pass characteristic show a low transmission in the short-wave range, which rises over a narrow spectral region to high transmission and remains high in the long-wave range. The range of low transmission (pure transmission value $\tau_{is} \leq 10^{-5}$) is called stop band, the range of high transmission (pure transmission value $\tau_{ip} \geq 0.99$) as pass range or pass band.

Optical square edge filters are characterized by means of certain parameters. Thus the absorption edge of such a filter is usually indicated as the so-called edge wavelength $\lambda C$. It corresponds to the wavelength, for which the spectral pure transmission factor between stop band and pass band amounts to half of the maximum value.

Optical square edge filters are usually realized by colored glasses, in which through colloidal elimination of semiconductor compounds during the cooling of the molten mass or through additional thermal treatment the coloring is produced. One speaks of so-called tarnish glasses.

Commercial square edge filters are manufactured by doping the basic glasses with cadmium semiconductor compounds. Depending upon the edge position CdS, CdSe, CdTe or also mixed compounds of these semiconductors are used for this. With these square edge filters edge wavelengths of a maximum of 850 nm can be reached. In addition, for the use e.g. in IR cameras or as laser protecting glass longer-wave square edges are desired. Due to the toxic and the carcinogenic characteristics of cadmium it is desired to be able to do without these compounds and to use other doping factors instead. In order to achieve equal or similar absorption properties of the glasses, alternative doping factors must likewise consist of semiconductors with direct optical transitions, because only through the special band structure of the semiconductors, the energy gap between valence band and conduction band, the sharp transitions between absorption range and transmission range of the glasses and thus to the filter characteristics of these glasses take place.

The I-III-VI semiconductor system, e.g. copper-indium-bisulfide and copper-indium-biselenide could also represent an alternative to the CdS—, CdSe—, CdTe— compounds. These for a long time well-known semiconductors are so far only of greater practical importance in the photovoltaic.

In a number of Russian and Soviet patent applications for a very close glass composition range are already $CuInS_2$ doped and/or $CuInS_2$—$CuInSe_2$ mix doped glasses described, which are supposed to be applied as filters: SU 167702A1, SU 1527199A1, RU 2073657C1, SU 1770297A1, SU 1770298A1, SU 1678786A1, SU 1701658A1, SU 1677025, SU 1675239A1, SU 1675240A1 and SU 1787963A1. All these glasses have in common that they contain no or very little $B_2O_3$ and no or very little ZnO and that they have with portions of up to 79% in weight a high $SiO_2$ content. The glasses of these applications do not possess good chemical stabilities.

It is subject of the invention to make chemically resistant optical Cd-free colored glasses available, which possess square edge characteristics and exhibit absorption edges between >0.4 μm and 1.2 μm.

It is further a subject of the invention to make such square edge filters available.

It is further a subject of the invention to make a procedure available for the production of optical colored glasses.

The tasks are solved through a glass according to claim 1, a procedure according to claim 9, a usage according to claim 10 and a square edge filter according to claim 11.

Alkali-zinc-silicate-glass serves as basic glass. The basic glass is based on the oxides $SiO_2$, which have the function of forming the structure, ZnO, which has the function of forming the structure and transforming the structure, and $K_2O$ and optional $Na_2O$, which have the function of transforming the structure.

$SiO_2$ constitutes the main part of the glass with 50 to 62% in weight. Higher portions would increase the crystallization tendency and would worsen the fusibility.

ZnO is present with 13.5 to 37% in weight. It increases the resistance to thermal shock of the glass, a characteristic, which is substantial for the intended use of the glass behind or in front of strong radiation sources, which are always accompanied by a high temperature emission. ZnO supports in addition the homogeneous nano-crystallization of the doping material in the glass. I.e. during the warming up of the glass in such a way homogeneous crystal growth of the semiconductor doping factors is ensured. The very pure and bright color and the sharp absorption edge of the glasses result from these mono dispersive crystallites. With ZnO contents lower than 13.5% in weight the glasses show a worse or no tarnish behavior. A ZnO portion of at least 18% in weight is preferred. The mentioned upper limit of ZnO is meaningful, since glasses, which exhibit a higher ZnO content, have a tendency for the formation of drip-like elimination areas and thus for separation. The separation tendency of such "Zinc-silicate glasses" can be lowered by the use of the structure transformer $K_2O$. In order to prevent micro elimination of ZnO enriched areas and to reduce their processing temperature, the glasses contain 10 to 25% in weight, preferably 18 to 25% in weight $K_2O$. The glass can contain in addition up to 14% in weight $Na_2O$, which affects mainly the physical characteristics like the fixed viscosity reference points and the coefficients of expansion. With higher concentration of $Na_2O$ the chemical stability would decrease, the coefficient of expansion would be too high and the transformation temperature would be too low. Preferably the sum of amounts of $K_2O$ and $Na_2O$ are 29% in weight at the most. The other expensive alkali oxides $Li_2O$, $Rb_2O$, $Cs_2O$ can in principle also be used, however due to their price disadvantage they are preferably are not used.

Besides ZnO also $B_2O_3$ promotes the resistance to thermal shock of the glass. $B_2O_3$ is contained with 3 to 5% in weight in the glass. $B_2O_3$ improves the fusibility of the glass.

The glass can contain further up to 1% in weight F. F serves for the improvement of the fusibility, i.e. it lowers the viscosity of the glass.

The glass can contain also up to 1% in weight C. C serves as reducing agent, in order to prevent an oxidation of the compound semiconductors.

The glass is suitable in an outstanding fashion for the formation of nano-crystals from compound semiconductors of the class I-III-VI which is distributed colloidal in the glass.

The nano-crystallization is affected during the tarnish process by the glass viscosity, the oversaturation, the solubility product and the growth rate of the color carriers. The tarnish process, which contains the coloring and thus the elimination of the crystallites of the semiconductor compounds, takes place either already at the cooling of the glasses and/or through a further temperature treatment within the range $Tg \leq 200K$. The tarnish temperature and tarnish times thereby affect the crystallite size. The larger the crystallites become, the smaller becomes the band gap of the semiconductors and the more longer-waved (=red) is the inherent color of the glass. The specialist knows how to control these factors if possible.

The glasses contain the compound semiconductors $M^I M^{III} Y^{II}_2$ (whereby $M^I = Cu^+, Ag^+, M^{III} = In^{3+}, Ga^{3+}, Al^{3+}, Y^{II} = S^{2-}, Se^{2-}$ can be) as chromophore components, thus as doping factors to impart the filter characteristics,.

The sum of the compound semiconductors in the glass amounts to at least 0.1% in weight, which corresponds to the minimum concentration of colloidal micro crystals distributed in the glass for the light absorption, and at the most 3% in weight, preferably at the most 1% in weight. Higher contents than 3% in weight would lower the transmission within the pass range after the tarnish process in an unacceptable manner. From the mentioned ternary semiconductor systems $M^IM^{III}Y^{II}_2$ are all edge components, thus e.g. $CuInS_2$, $CuInSe_2$, $CuGaS_2$, $CuGaSe_2$, $AgInS_2$, $AgInSe_2$, $AgGaS_2$ and $AgGaSe_2$ as well as all mixed compounds of two component systems or multi component systems usable. It is also possible to use two or several edge components at the same time.

Doping factors of one or several components from the system $CuIn(Se_{1-x}S_x)_2$ with x=0 to 1, i.e. of the edge components $CuInSe_2$ and $CuInS_2$ as well as by their mixed compounds are particularly preferable. Particularly preferable is a doping factor content from 0.1 to 0.5% in weight. The absorption edge in the area between 360 nm to 1200 nm can be shifted by variations of the portions of the respective compounds and the conditions of the tarnish process. With doping factor contents between 0.1 and 0.5% in weight, in particular $CuIn(Se_{1-x}S_x)_2$ edge lengths between 400 nm and 1200 nm can be achieved.

For the characteristics as tarnish gas the components $In_2O_3$ and $Ga_2O_3$ with contents of 0–2% in weight in each case as well as $SO_3$ and $SeO_2$ with contents of 0–1% in weight are very favorable. These components prevent possible evaporations of the components $In_2O_3$, $Ga_2O_3$, S and Se from the compound semiconductors. Thus the chalcopyrite remains as the chromophore component in or close to the intended stoichiometry and thus at the desired specific edge position. Therefore the glasses contain at least 0.1% in weight of the oxide of the $M^{III}$, thus $M_2O_3$, which is/are present in $M^IM^{III}Y^{II}_2$, and at least 0.2% in weight of the oxide of $Y^{II}$, which is/are present in $M^IM^{III}Y^{II}_2$.

It is particularly preferable, to use $SO_3$ and/or $SeO_2$ not with elemental S and/or Se but in the form of ZnS and/or ZnSe. Preferable 0.1–4% in weight ZnS and/or ZnSe are used. Both components promote the structure of the chromophore crystals of the semiconductor compounds such as $CuInS_2$ and $CuInSe_2$ as auxiliary crystal components and thus the edge steepness and the transmission in the pass range.

With this procedure for the production of optical colored glasses of the composition range (in % in weight on oxide basis) $SiO_2$ 50–62, $K_2O$ 10–25; $Na_2O$ 0–14; MgO 0–4; CaO 0–10, BaO 0–10, SrO 0–10; $P_2O_5$ 0–10; $Al_2O_3$ 0–2; $B_2O_3$ 3–5; ZnO 13.5–37; F 0–1, $TiO_2$ 0–7; $In_2O_3$ 0–2; $Ga_2O_3$ 0–2; $SO_3$ 0–1; $SeO_2$ 0–1; C 0–1; and the doping factor $M^IM^{III}Y^{II}_2$ with $M^I$=$Cu^+$, $Ag^+$, $M^{III}$=$In^{3+}$, $Ga^{3+}$, $Al^{3+}$, $Y''$=$S^{2-}$, $Se^{2-}$ with at least 0.1% in weight of the oxide ($M_2O_3$) of the $M^{III}$, which is/are present in $M^IM^{III}Y^{II}_2$, and with at least 0.2% in weight of the oxide, or $Y''$, which is/are present in $M^IM^{III}Y^{II}_2$, with the process steps glass batch preparation, melting of the glass, cooling and warming up, with which 0.1–4% in weight ZnS and/or ZnSe are added to the glass batch, tarnish glasses with defined edge length can be manufactured easily, purposeful and reproducible. The requirements of the to be met conditions regarding temperature and time of the process steps cooling and warming up are smaller than with conventional procedures.

The term melting here combines the steps refining, homogenizing and conditioning for further processing, which follow the melting itself.

In addition the glass can contain up to 4% in weight MgO, up to 10% in weight CaO, up to 10% in weight BaO, up to 10% in weight SrO, up to 10% in weight $P_2O_5$, up to 2% in weight $Al_2O_3$ and up to 7% in weight $TiO_2$. $Al_2O_3$ improves the crystallization ability of the glass, MgO and CaO function in the basic glass similar to ZnO. They improve the chemical stability, and they are less expensive than ZnO. BaO and SrO serve for the fine tuning of the coefficient of expansion, transformation temperature and processing temperature. However, since BaO and SrO are more expensive than MgO and SrO, which are similar in many properties, they are preferably not used.

$P_2O_5$ can partially be exchanged against $SiO_2$ or $B_2O_3$ as structure formers. It is useful for the lowering of the viscosity at certain temperatures. $P_2O_5$ reduces however the chemical resistance and is therefore preferably not used.

The component $TiO_2$ in this glass system takes over mainly the function of the supporting UV-blocking. Square edge filters must fulfill an optical density in the stop band. Additional UV absorbers such as $TiO_2$ can support this.

The glasses can be molten with the help of the well-known usual melting procedures for tarnish glasses, i.e. under neutral and/or reducing conditions at temperatures of approx. 1100–1550° C. The glasses build already during the cooling process and/or through an additional temperature treatment finely divided nano-crystallites, which cause the color and/or a tarnishing of the glass.

For the improvement of the glass quality, one or more well-known refining media in the usual quantities can be added to the glass batch for the refining of the glass. Thus the glass exhibits a particularly good internal glass quality regarding the non-existence of bubbles and streaks.

EXAMPLES

Six examples of glasses according to the invention were molten from the usual optical raw materials. The raw materials were weighed, afterwards mixed thoroughly, melted in usual procedures with approx. 1300° C. to 1550° C. and well homogenized. The temperature at pouring was approx. 1450° C.

In Table 2 the following are indicated: the respective composition (in % in weight) and the edge wavelength $\lambda_C$ [nm] (sample thickness d=3 mm), tarnish temperatures [° C.] and rise times [h].

Table 1 shows a melting example, for the glass in accordance with example 1 from Table 2. The glass was cooled with 20 K/h and afterwards temperature treated for 3 h at approx. 560° C. The glass possesses an edge wavelength $\lambda_C$ of 420 nm.

TABLE 1

Melting example of a 0.5-1-glass batch

| Component | % in weight | Raw material | Originally weighted-in quantity [g] |
| --- | --- | --- | --- |
| $SiO_2$ | 52.84 | $SiO_2$ | 524.67 |
| $B_2O_3$ | 4.07 | $B_2O_3$ | 40.80 |
| ZnO | 19.71 | ZnO | 194.96 |
| $K_2O$ | 22.84 | $K_2CO_3$ | 332.91 |
| $SO_3$ | 0.1 | ZnS | 1.02 |
| $CuInSe_2$ | 0.23 | $CuInSe_2$ | 2.55 |

TABLE 2

Glass composition (in % in weight), edge wavelength $\lambda_c$, tarnish temperature [° C.] and tarnish time [h]
(the difference to 100% results from taking into account $CuInS_2/CuInSe_2$ as CuO, $In_2O_3$, $SO_3/SeO_2$)

|  | 1 | 2 | 3 | 4 | 5 | 6 |
|---|---|---|---|---|---|---|
| $SiO_2$ | 52.84 | 52.9 | 52.5 | 52 | 61.95 | 52.75 |
| $B_2O_3$ | 4.07 | 4.07 | 4.05 | 4 | 3 | 4.05 |
| ZnO | 19.71 | 19.74 | 19.64 | 19.4 | 13.99 | 19.68 |
| $Na_2O$ | — | — | — | — | 8.99 | — |
| $K_2O$ | 22.84 | 22.86 | 22.75 | 22.47 | 11.59 | 22.8 |
| $SO_3$ | 0.1 | 0.16 | — | — | 0.21 | — |
| $CuInS_2$ | — | 0.22 | — | 1 | 0.22 | 0.091 |
| $CuInSe_2$ | 0.23 | — | 0.5 | — | — | 0.094 |
| C | — | — | — | — | 0.05 | — |
| $\lambda_c$ [nm] d = 3 mm, (tarnish temperature [° C.]/ tarnish time [h]) | 420 (560/3) | 324 (–/0) | 507 (–/0) | 1010 (–/0) | 780 (–/0) | 416 (–/0) |
| $\lambda_c$ [nm] d = 3 mm, (tarnish temperature [° C.]/ tarnish time [h]) | 460 (560/57) | 415 (500/150) | 613 (560/57) | 1030 (590/150) | 898 (595/50) | — |
| $\lambda_c$ [nm] d = 3 mm, (tarnish temperature [° C.]/ tarnish time [h]) | — | 521 (515/150) | — | — | 960 (610/150) | — |

The glasses according to the invention and the glasses manufactured in the procedure according to the invention are especially suitable for the use as optical square edge filters with long pass characteristic due to their transmission course. They show in the stop band a good optical density of $\geq 3$, whereby the optical density is defined as OD $(\lambda)=1$ g $(1/\tau(\lambda))$. Their transmission in approximately the pass band, which is longer-waved compared to the stop band, is sufficiently high with $\geq 88\%$. Their absorption edge is sufficiently steep. It can be moved with $M^IM^{III}Y^{II}$ doped glasses, for which is $M^I=Cu^+$, $Ag^+$, $M^{III}=In^{3+}$, $Ga^{3+}$, $Y^{II}=S^{2-}$, $Se^{2-}$ between 400 nm and 1200 nm. Therefore the glasses cover with the area of edge position of the usual Cd-containing tarnish glasses as far as possible and go in the long-wave are far beyond these.

If the glasses contain aluminum doping factors, thus $M^I$-Al (S, Se) compound semiconductors like e.g. $CuAlS_2$ and $CuAlSe_2$ or their mixed components alone or in combination with the other mentioned M'M"Y" systems, then edge lengths up to a minimum of 360 nm are produced.

When using exclusively the $M^I$-Al—(S, Se) doping factors, preferably the Cu—Al—(S,Se) doping factor, edge lengths between 460 nm and 360 nm is produced preferably between 0.1 and 0.5% in weight.

FIG. 1 shows the transmissions course (transmission factor versus wave length $\lambda$) at samples of the thickness 3 mm of the examples 1 and 2 (reference numbers 2 and 3) as well as a comparison example (reference number 1). The comparison example is the commercially available Cd-containing glass GG 420 of the applicant.

The glasses according to the invention are environmental friendly, as they do not need any Cd-containing components. Due to their composition they can be easily melted, they are chemically resistant and resistant to thermal shock.

Their tarnish behavior is easily controllable. This applies in particular to the glasses manufactured in the procedure according to the invention, which exhibit steep absorption edges.

What is claimed is:

1. Optical colored glass characterized by a composition (in % in weight) of

| | |
|---|---|
| $SiO_2$ | 50–62 |
| $K_2O$ | 10–25 |
| $Na_2O$ | 0–14 |
| $Al_2O_3$ | 0–2 |
| $B_2O_3$ | 3–5 |
| ZnO | 13.5–37 |
| F | 0–1 |
| $TiO_2$ | 0–7 |
| $In_2O_3$ | 0–2 |
| $Ga_2O_3$ | 0–2 |
| $SO_3$ | 0–1 |
| $SeO_2$ | 0–1 |
| C | 0–1 |
| $M^IM^{III}Y^{II}_2$ | 0.1–3 | whereby $M^I=Cu^+$ and/or $Ag^+$
$M^{III}=In^{3+}$ and/or $Ga^{3+}$ and/or
$Al^{3+}$, $Y^{II}=S^{2-}$ and/or $Se^{2-}$
with at least 0.1% in weight of the oxide ($M_2O_3$) of the $M^{III}$ which is/are present in $M^IM^{III}Y^{II}_2$, and with at least 0.2% in weight of the oxide, of $Y^{II}$, which is/are present in $M^IM^{III}Y^{II}_2$,
as well as usual refining media if necessary in usual quantities.

2. Optical colored glass according to claim 1, characterized by a composition (in % in weight) of

| | |
|---|---|
| $SiO_2$ | 50–62 |
| $K_2O$ | 18–25 |
| $Na_2O$ | 0–14 |
| $B_2O_3$ | 3–5 |
| ZnO | 13.5–37 |
| F | 0–1 |

-continued

| | |
|---|---|
| $Al_2O_3$ | 0–2 |
| $TiO_2$ | 0–7 |
| $In_2O_3$ | 0–2 |
| $Ga_2O_3$ | 0–2 |
| $SO_3$ | 0–1 |
| $SeO_2$ | 0–1 |
| C | 0–1 |

$M^I M^{III} Y^{II}$, whereby $M^I=$
$Cu^+$ and/or $Ag^+$, $M^{III}=$
$In^{3+}$ and/or $Ga^{3+}$, $Y^{II}_2$
$=S^{2-}$ and/or $Se^{2-}$ with at least 0.1% in weight of the oxide ($M_2O_3$) of the $M^{III}$ which is/are present in $M^I M^{III} Y^{II}_2$, and with at least 0.2% in weight of the oxide, of $Y^{II}$, which is/are present in $M^I M^{III} Y^{II}_2$, as well as usual refining media if necessary in usual quantities.

3. Optical colored glass, according to claim 1,
thus characterized
that it additionally contains (in % in weight on oxide basis)

| | |
|---|---|
| MgO | 0–4 |
| CaO | 0–10 |
| BaO | 0–10 |
| SrO | 0–10 |
| $P_2O_5$ | 0–10 | as well as usual refining media if necessary in usual quantities.

4. Optical colored glass according to claim 3, characterized by the fact that it contains between 0.1 and 0.5% in weight $CuIn(Se_{1-x}S_x)_2$.

5. Optical colored glass according to claim 4 with an edge wavelength λC between 360 nm and 1200 nm.

6. Optical colored glass according to claim 2 with an edge wavelength λC between 400 nm and 1200 nm.

7. Optical colored glass according to claim 1, characterized by the fact that it contains between 0.1 and 0.5% in weight $CuAl(Se_{1-x}S_x)_2$.

8. Optical colored glass according to claim 7 with an edge wavelength λC between 360 nm and 460 nm.

9. Procedure for the production of optical colored glasses of the composition range

| | |
|---|---|
| $SiO_2$ | 50–62 |
| $K_2O$ | 10–25 |

-continued

| | |
|---|---|
| $Na_2O$ | 0–14 |
| MgO | 0–4 |
| CaO | 0–10 |
| BaO | 0–10 |
| SrO | 0–10 |
| $P_2O_5$ | 0–10 |
| $Al_2O_3$ | 0–2 |
| $B_2O_3$ | 3–5 |
| ZnO | 13.5–37 |
| F | 0–1 |
| $TiO_2$ | 0–7 |
| $In_2O_3$ | 0–2 |
| $Ga_2O_3$ | 0–2 |
| $SO_3$ | 0–1 |
| $SeO_2$ | 0–1 |
| C | 0–1 |

$M^I M^{III} Y^{II}_2$ whereby $M^I = Cu^+$, $Ag^+$
$M^{III} = In^{3+}$, $Ga^{3+}$, $Al^{3+}$
$Y^{II} S^{2-}$, $Se^{2-}$ with at least 0.1% in weight of the oxide ($M_2O_3$) of the $M^{III}$ which is/are present in $M^I M^{III} Y^{II}_2$, and with at least 0.2% in weight of the oxide, of $Y^{II}$, which is/are present in $M^I M^{III} Y^{II}_2$, as well as usual refining media if necessary in usual quantities.

with the process steps glass batch preparation, melting of the glass, cooling, warming up, whereby 0.1–4% in weight ZnS and/or ZnSe are added to the glass batch.

10. Optical square edge filter consisting essentially of a glass according to claim 1.

11. Optical square edge filter consisting essentially of a glass manufactured by the process of claim 9.

12. Optical colored glass according to claim 1, characterized by the fact that it contains between 0.1 and 0.5% in weight $CuIn(Se_{1-x}S_x)_2$.

13. Optical colored glass according to claim 2, characterized by the fact that it contains between 0.1 and 0.5% in weight $CuIn(Se_{1-x}S_x)_2$.

14. Optical colored glass according to claim 3 with an edge wavelength λC between 400 nm and 1200 nm.

15. Optical colored glass according to claim 4 with an edge wavelength λC between 400 nm and 1200 nm.

16. Optical colored glass according to claim 1 with an edge wavelength λC between 360 nm and 1200 nm.

17. Optical colored glass according to claim 4 with an edge wavelength λC between 360 nm and 1200 nm.

18. Optical colored glass according to claim 3 with an edge wavelength λC between 360 nm and 1200 nm.

* * * * *

UNITED STATES PATENT AND TRADEMARK OFFICE
CERTIFICATE OF CORRECTION

PATENT NO. : 6,852,657 B2  
DATED : February 8, 2005  
INVENTOR(S) : Uwe Kolberg et al.

Page 1 of 1

It is certified that error appears in the above-identified patent and that said Letters Patent is hereby corrected as shown below:

<u>Column 7,</u>  
Line 11, after "$M^I$" = insert -- 0.1 – 1 --.

<u>Column 8,</u>  
Line 18, after "$Y^{II}_2$" insert -- 0.1 – 1 --.

Signed and Sealed this

Thirteenth Day of September, 2005

JON W. DUDAS  
*Director of the United States Patent and Trademark Office*